United States Patent
Jackson et al.

(10) Patent No.: US 7,697,282 B2
(45) Date of Patent: Apr. 13, 2010

(54) TIP-RESISTING STAND FOR FLOOR STANDING CHASSIS

(75) Inventors: Bradley A. Jackson, Pflugerville, TX (US); Kristine M. Little, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 11/697,118

(22) Filed: Apr. 5, 2007

(65) Prior Publication Data

US 2008/0245934 A1    Oct. 9, 2008

(51) Int. Cl.
*H05K 5/00*    (2006.01)
*H05K 7/00*    (2006.01)

(52) U.S. Cl. .............................. 361/679.59; 361/679.6

(58) Field of Classification Search ................. 361/683, 361/679.59, 679.6
See application file for complete search history.

(56) References Cited

U.S. PATENT DOCUMENTS

| | | | |
|---|---|---|---|
| 5,020,768 A * | 6/1991 | Hardt et al. ................. 248/678 |
| D338,882 S * | 8/1993 | Reiter ........................ D14/447 |
| 5,388,792 A * | 2/1995 | Hastings et al. ........... 248/188.1 |
| 5,749,637 A * | 5/1998 | McMahan et al. ......... 312/223.2 |
| 6,099,097 A * | 8/2000 | Hocker et al. ............... 312/327 |
| 6,141,209 A * | 10/2000 | Kerrigan et al. ............. 361/683 |
| 6,193,208 B1 * | 2/2001 | Schmitt et al. .............. 248/688 |
| 6,364,278 B1 | 4/2002 | Lin et al. |
| 6,525,929 B2 * | 2/2003 | Carr ............................ 361/683 |
| 6,535,379 B1 * | 3/2003 | Smeenge et al. ............ 361/683 |
| 6,616,113 B2 * | 9/2003 | Justin .................... 248/346.01 |
| 6,929,337 B2 * | 8/2005 | Helot et al. .............. 312/223.2 |
| 7,134,635 B2 * | 11/2006 | Burriel et al. ............... 248/500 |
| 7,293,784 B2 * | 11/2007 | Liu .............................. 280/35 |
| 7,450,371 B2 * | 11/2008 | Searby ....................... 361/683 |

* cited by examiner

*Primary Examiner*—Jayprakash N Gandhi
*Assistant Examiner*—Anthony M Haughton
(74) *Attorney, Agent, or Firm*—Haynes and Boone, LLP

(57) ABSTRACT

A support for a floor standing chassis includes a pair of spaced apart support members mounted on a support surface of the chassis. A support stand includes a first end operable for keyed engagement with a first one of the support members, and in response to the keyed engagement, a second end of the support stand is aligned for releasable engagement with the second support member. A pair of feet extend laterally from the stand.

12 Claims, 7 Drawing Sheets

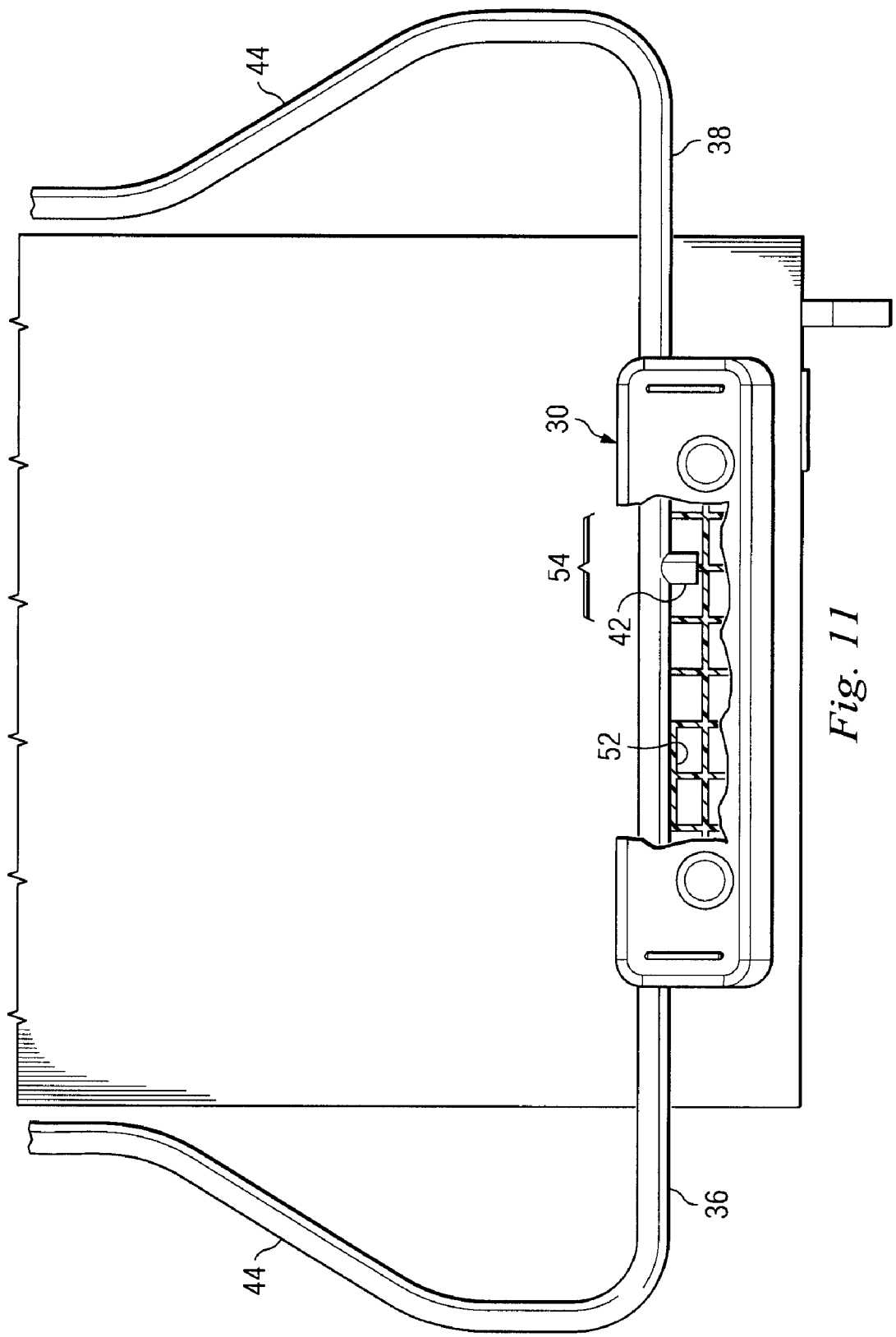

TIP-RESISTING STAND FOR FLOOR STANDING CHASSIS

BACKGROUND

The disclosures herein are generally to an information handling system (IHS) and more particularly to a support for an upright chassis of an IHS.

As the value and use of information continues to increase, individuals and businesses seek additional ways to process and store information. One option available to users is IHSs. An IHS generally processes, compiles, stores, and/or communicates information or data for business, personal, or other purposes thereby allowing users to take advantage of the value of information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Large floor standing electronics units have an increased need for stability. Normally, desktop computers have a tip test, where the unit must not fall over when tipped, but heavier chassis have the added requirement of constant force test; i.e. when a force is applied any direction except upwards, the unit cannot fall over.

Because stabilizing the chassis of a floor standing tower unit for an IHS, for example, may require features to extend outside the envelope of the chassis, such features may need to be installed by the customer or user after the unit is unpacked.

Therefore, what is needed is a support stand for floor standing electronics units which can be quickly and easily attached and removed from its respective unit without the use of tools.

SUMMARY

One embodiment, accordingly, includes a chassis, a first support member mounted on a support surface of the chassis, a second support member mounted on the support surface of the chassis such that the first and second support members are spaced apart, and a support stand having a first end operable for keyed engagement with the first support member, and in response to the keyed engagement, a second end of the support stand being aligned for releasable engagement with the second support member.

A principle advantage of this embodiment is that no tools are required for quickly attaching and detaching the stand from the chassis.

BRIEF DESCRIPTION OF THE DRAWINGS

FIG. 11 is a partial bottom view illustrating an embodiment of the tower unit supported by the support stand engaged with a cut-away view of an associated support member.

DETAILED DESCRIPTION

For purposes of this disclosure, an IHS may include any instrumentally or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network input or output (I/O) devices, such as a keyboard, a mouse, and a video display. The IHS may also include one or more buses operable to transmit communications between the various hardware components.

Figure 1:
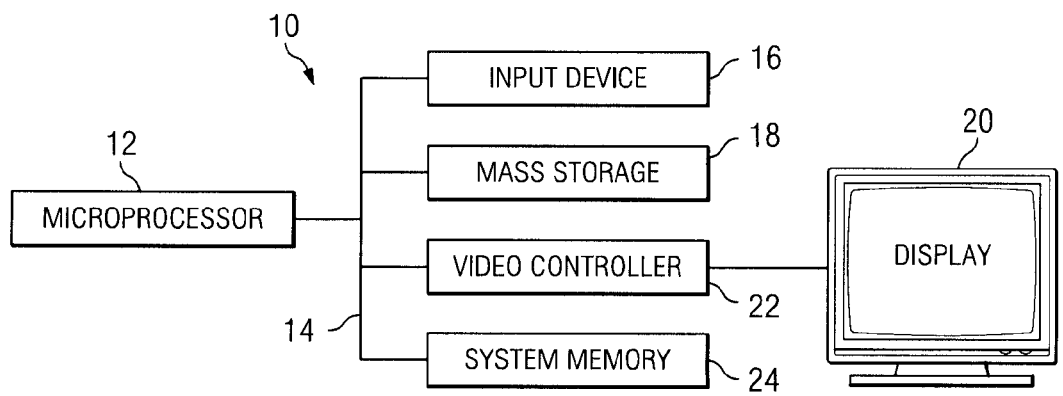
FIG. 1 is diagrammatic view illustrating an embodiment of an IHS.

In one embodiment, IHS 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magnet-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
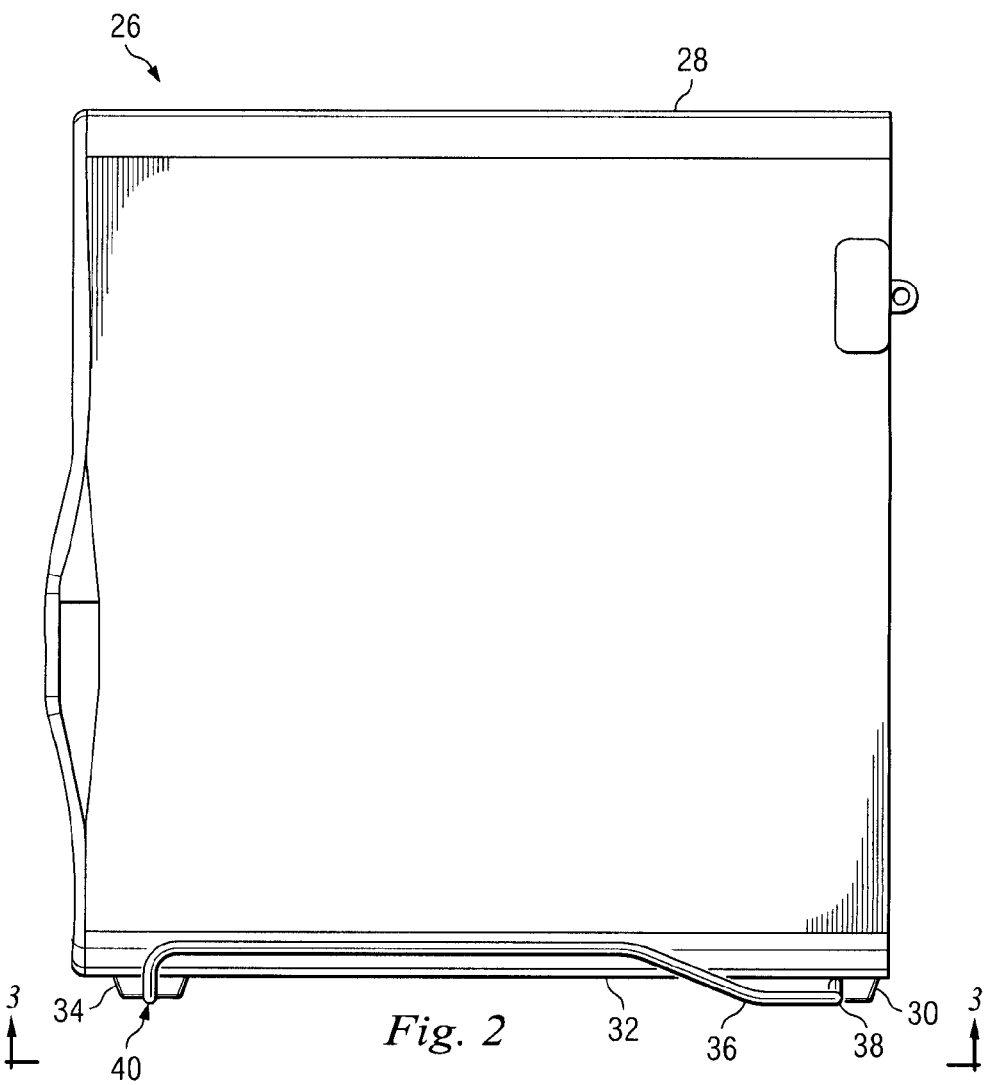
FIG. 2 is a side view illustrating an embodiment of a tower unit supported by a support stand.
Figure 3:
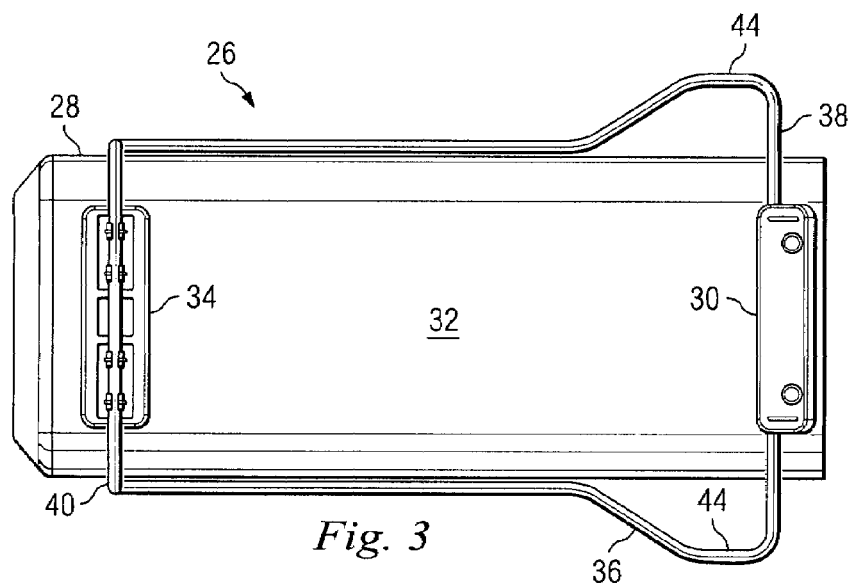
FIG. 3 is a bottom view illustrating the tower unit taken along the line 3-3 of FIG. 2.

A floor standing tower unit 26, for housing at least some components of IHS 10, is illustrated in FIGS. 2 and 3. Tower unit 26 includes a chassis 28, a first support member 30 mounted on a support surface 32 of chassis 28, and a second support member 34 mounted on the support surface 32. The first support member 30 is spaced apart from the second support member 34. A support stand 36 has a first end 38 operable for keyed engagement with the first support member 30, and a second end 40 which releasably engages the second support member 34 as will be described below in further detail.

Figure 4:
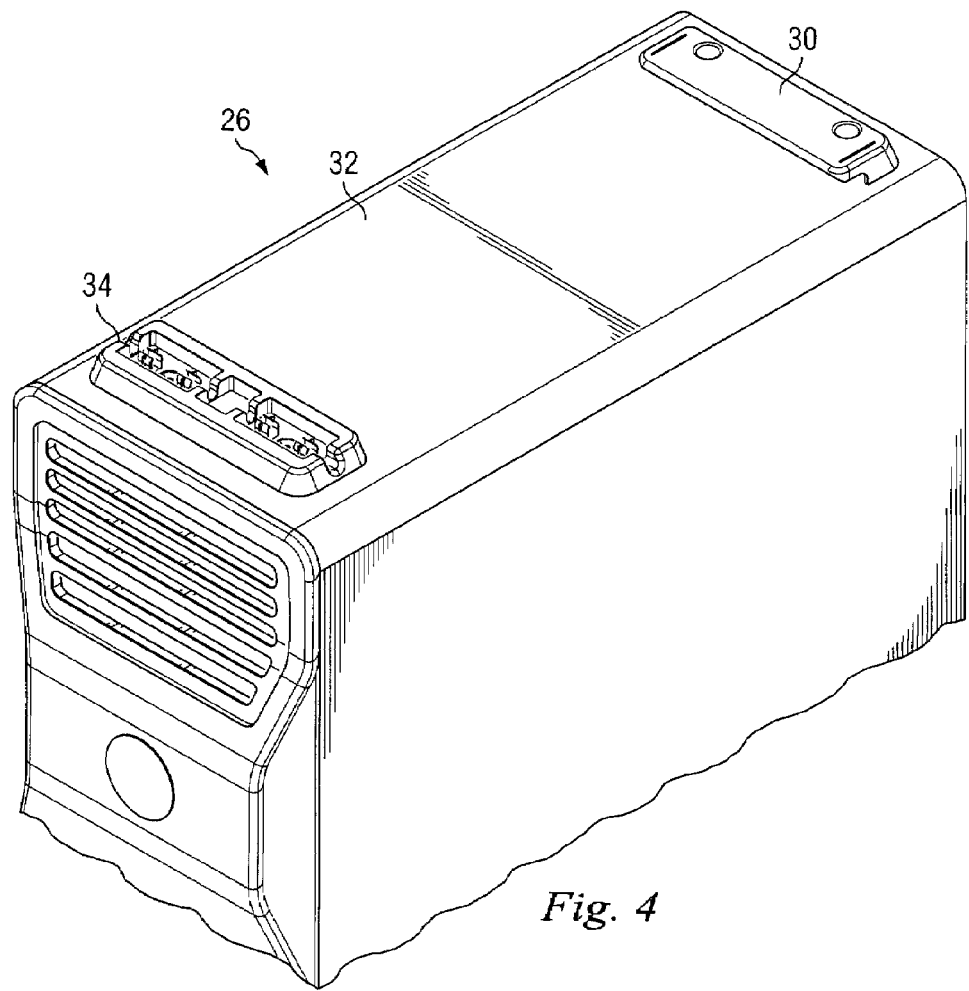
FIG. 4 is a partial perspective view illustrating an embodiment of the tower unit.

In FIG. 4, the support surface 32 of tower unit 26 is illustrated. The first support member 30 is shown attached to surface 32 and the second support member 34 is also shown.

Figure 5:
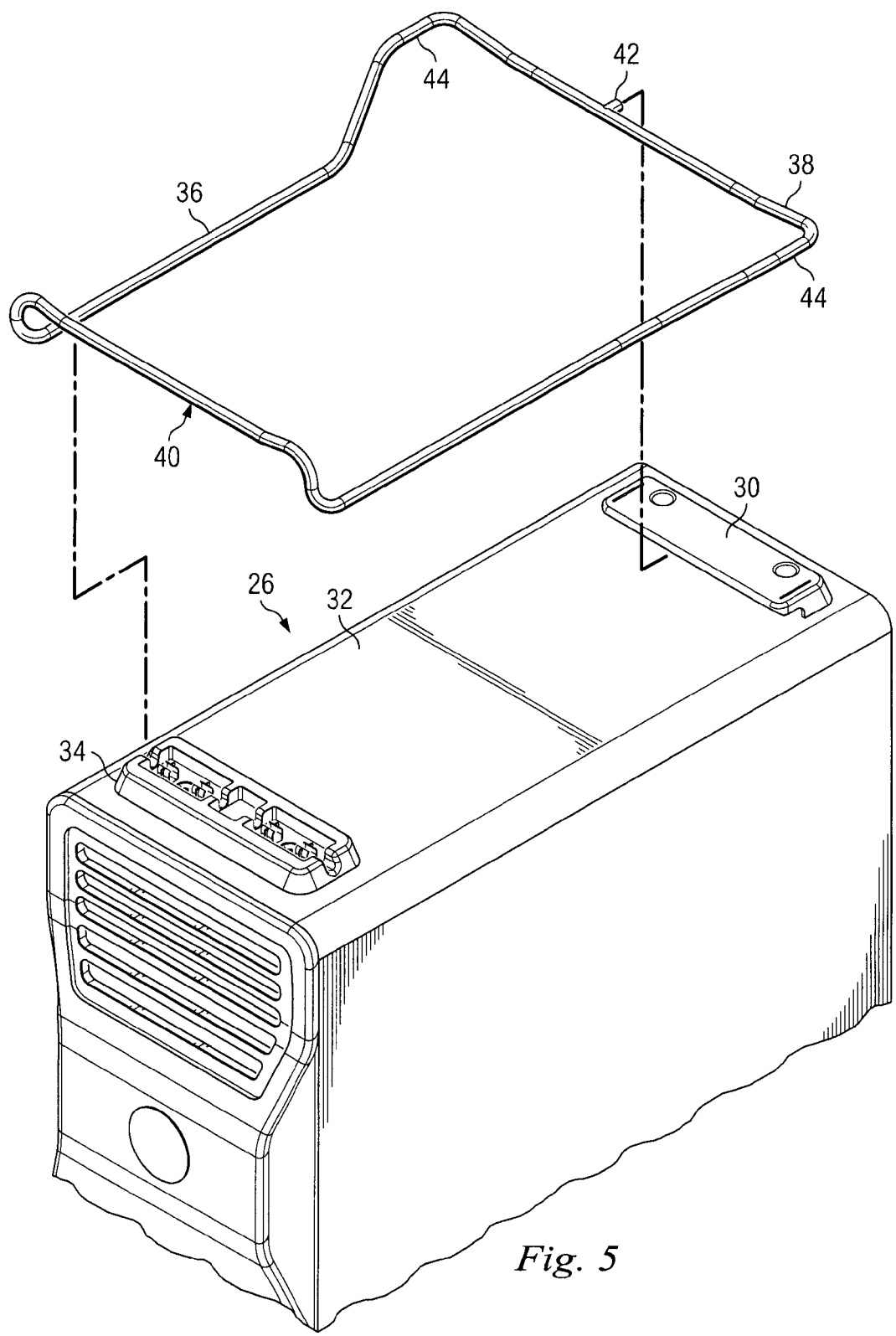
FIG. 5 is another partial perspective view illustrating an embodiment of the tower unit and the associated support stand.

In FIG. 5 the support stand 36 is illustrated adjacent to but unattached to the tower unit 26. The support stand 36 includes a key 42 on the first end 38. Also, adjacent the first end 38, the support stand includes a pair of extendable feet 44 which extend outwardly in opposite directions. The first end 38 of stand 36 is operable for keyed engagement with first support member 30 and the second end 40 of stand 36 releasably engages the second support member 34.

Figure 6:
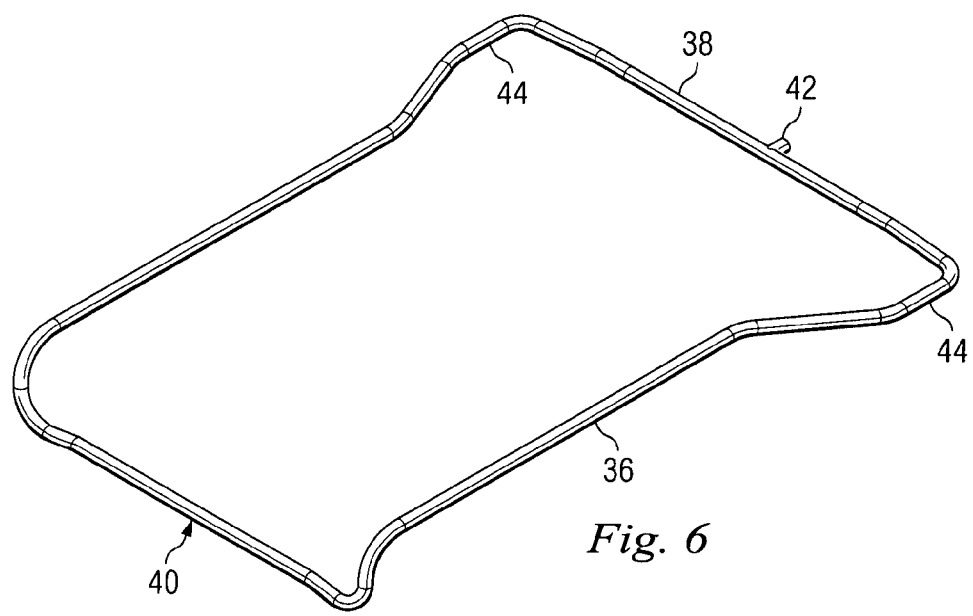
FIG. 6 is a perspective view illustrating an embodiment of the support stand.

In FIG. 6, support stand 36 is illustrated in an inverted position from that shown in FIG. 5. Key 42 is mounted on first end 38, and the extended feet 44 are adjacent the first end 38. Second end 40 is also shown.

Figure 7:
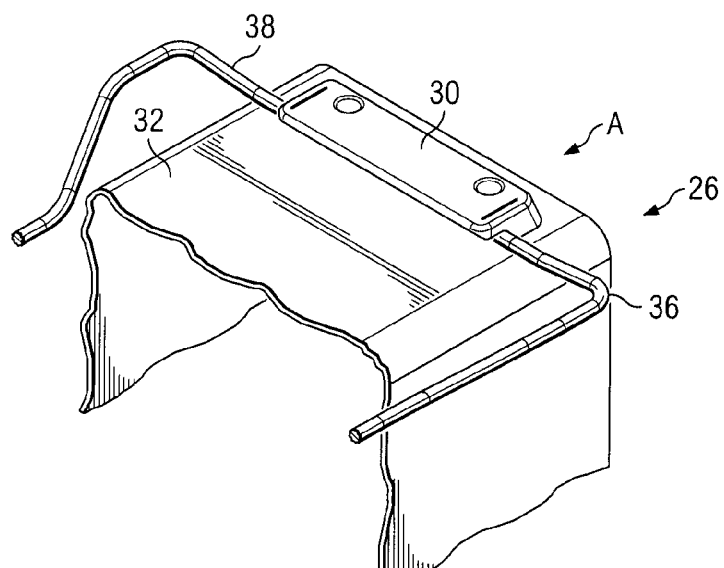
FIG. 7 is a partial perspective view illustrating an end of the support stand engaged with a support member.

In FIG. 7, one end A of unit 26 is partially shown as is a portion of support surface 32. The first support member 30 is shown engaged with the first end 38 of support stand 36.

Figure 8:
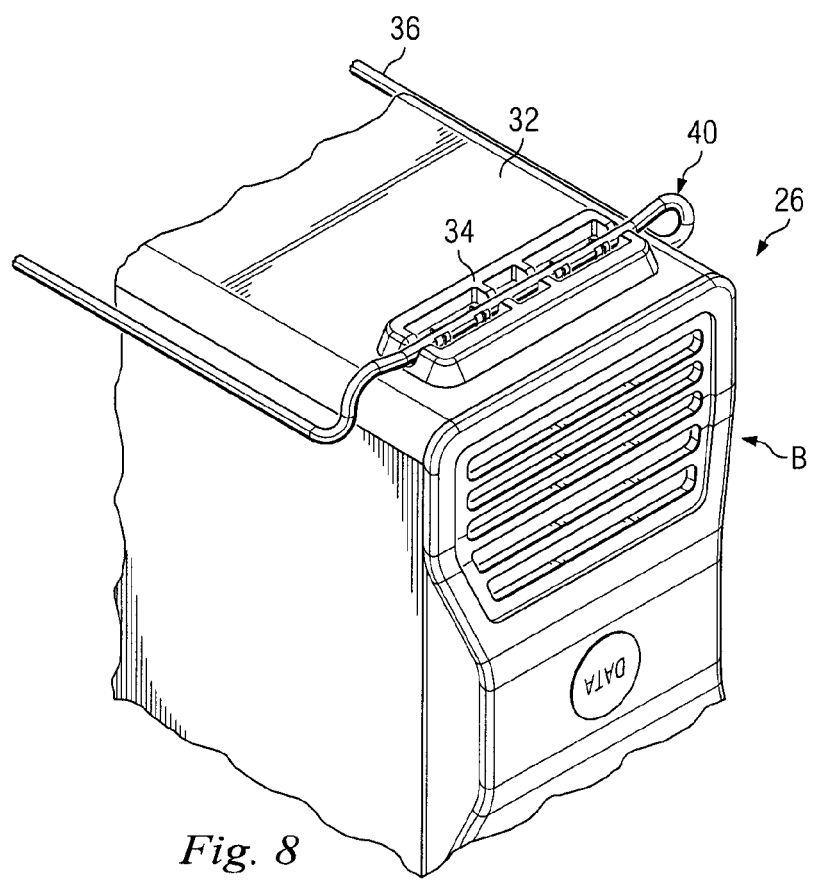
FIG. 8 is a partial perspective view illustrating an opposite end of the support stand engaged with a support member.

In FIG. 8, another end B, opposite the end A shown in FIG. 7, of unit 26 is partially shown as is a portion of support surface 32. The second support member 34 is shown engaged with the second end 40 of the support stand 36.

Figure 9:
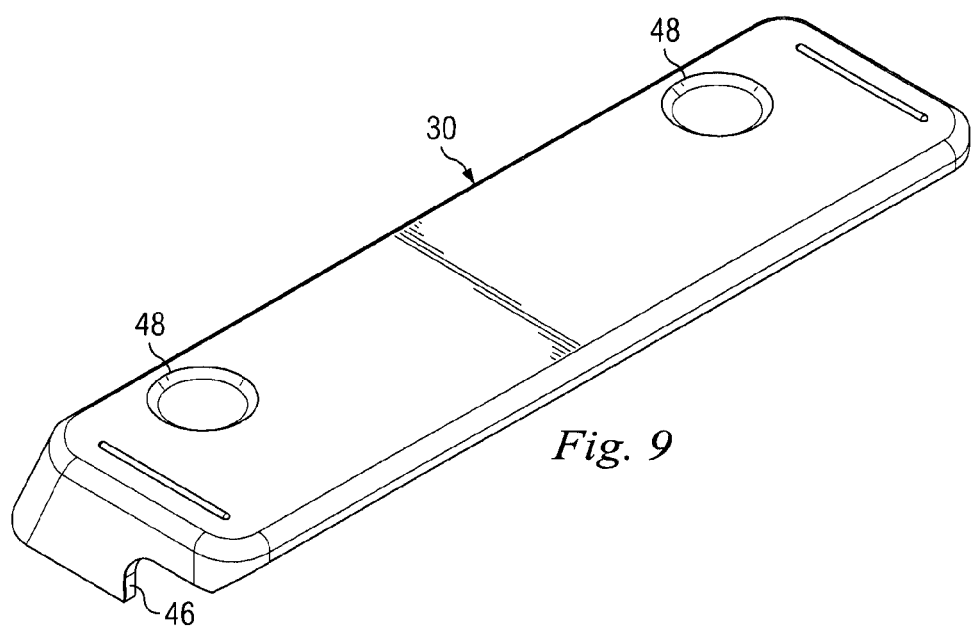
FIG. 9 is a perspective view illustrating an embodiment of a support member.
Figure 10:
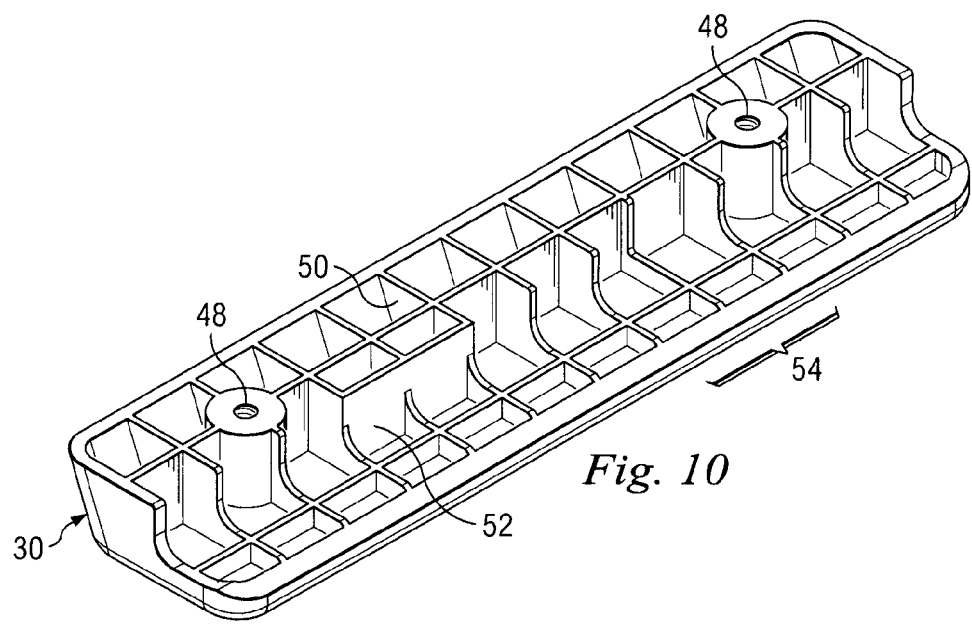
FIG. 10 is an inverted perspective view illustrating an embodiment of the support member of FIG. 9.

The first support member 30 is further illustrated in relatively inverted FIGS. 9 and 10, i.e. FIG. 9 being inverted relative to FIG. 10. Support member 30 includes an L shaped slot 46 for receiving end 38 of support stand 36, and apertures 48 for receiving fasteners (not shown) which attach support member 30 to support surface 32, discussed above. In the inverted view of FIG. 10, a plurality of reinforcing ribs 50 are illustrated. Ribs 50 are connected to apertures 48 as is a key rejecting member 52 which is provided to limit seating of key 42 of support stand 36, discussed above. As such, key 42 must be engaged with support member 30 in such a manner as to permit key 42 to seat in a slot 54 provided in ribs 50, also see FIG. 11. As a result of such proper seating of end 38 of support stand 36, feet 44 are properly positioned to stabilize tower unit 26 to limit tipping, see also FIGS. 2 and 3.

Figure 12:
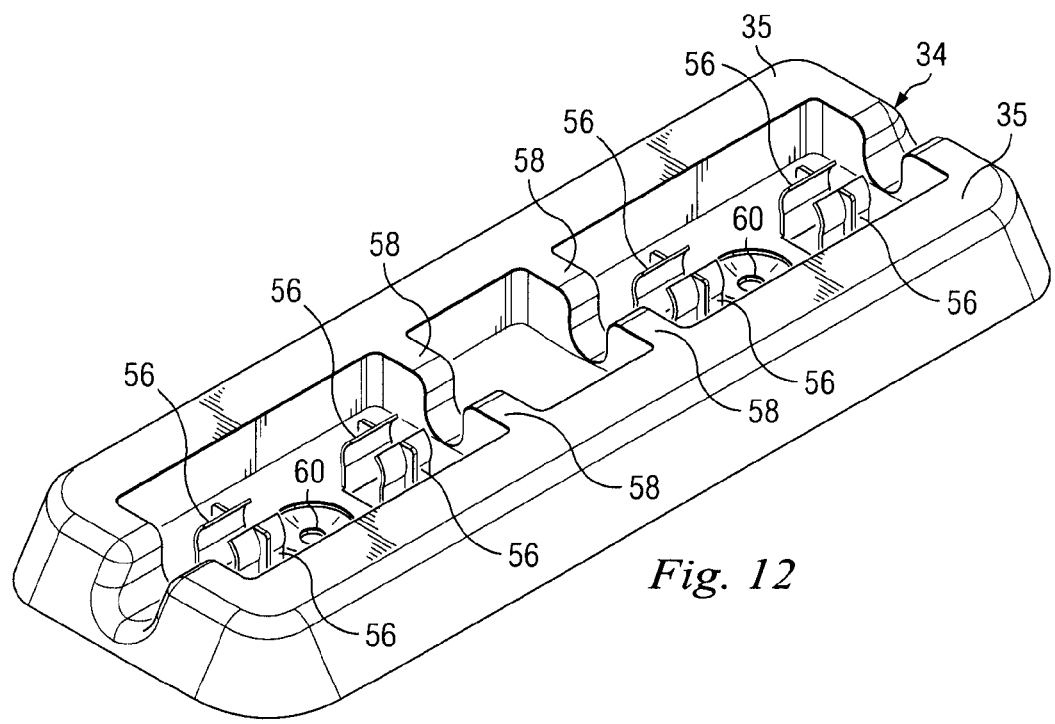
FIG. 12 is an isometric view illustrating an embodiment of a support member.

As a result of the proper seating of end 38 and key 42 in slot 54, the opposite end 40 of support stand 36 is properly aligned for engagement with second support member 34, see FIGS. 8 and 12. Second support member 34 includes at least one resilient snap-in member 56, and preferably a plurality thereof, operable for releasably receiving end 40 of support stand 36. At least one guide member 58 guides end 40 into engagement with the resilient members 56. In the event an attempt is made to mistakenly engage end 38 with second support member 34, key 42 would limit such engagement due to key 42 striking a rib 35 of second support member 34. Apertures 60 receive fasteners (not shown) for attaching member 34 to support surface 32 of tower unit 26.

In operation, tower unit 26 includes support members 34 and 30. End 38 of support stand 36 is inserted into slot 46 in an orientation which locates key 42 in slot 54, otherwise key 42 will not properly seat in support member 30. End 40 is now properly aligned to be received and retained by snap-in resilient members 56, and feet 44 are properly positioned to support tower unit 26 in an upright position resistant to tipping. End 40 is easily primarily released from resilient receivers 56, and end 38 is easily secondarily removed from slot 46 of support member 30.

Although illustrative embodiments have been shown and described, a wide range of modification, change and substitution is contemplated in the foregoing disclosure and in some instances some features of the embodiments may be employed without a corresponding use of other features. Accordingly, it is appropriate that the appended claims be construed broadly and in a manner consistent with the scope of the embodiments disclosed herein.

What is claimed is:

1. A floor standing electronics unit comprising:
    a chassis;
    a first support member mounted on a support surface of the chassis and including a first slotted receiver for a support stand formed by a continuous member;
    a second support member mounted on the support surface of the chassis, the second support member being spaced apart from the first support member and including a second snap-in receiver for the support stand;
    the support stand having a first end operable for keyed engagement with the first receiver in the first support member, and in response to the keyed engagement, a second end of the support stand being aligned for releasable engagement with the second receiver in the second support member, the stand including a pair of feet extended in opposite directions outboard of opposite sides of the electronics unit wherein the second support member includes a resilient member operable for receiving the second end of the stand.

2. The electronics unit of claim 1 wherein the first end of the stand includes a key.

3. The electronics unit of claim 2 wherein the first support member includes a key rejecting member.

4. The electronics unit of claim 1 wherein the second support member includes guide members operable for guiding the second end of the stand into the resilient member.

5. An information handling system (IHS) comprising:
    a chassis having a support surface;
    a microprocessor mounted in the chassis;
    a first support member mounted on a first end of the support surface and including a first slotted receiver for a support stand formed by a continuous member;
    a second support member mounted on a second end of the support surface and including a second snap-in receiver for the support stand;
    the support stand having a first end operable for keyed pivotable engagement with the first receiver in the first support member and having a second end operable for aligned releasable engagement with the second receiver in the second support member, the stand including a pair of feet extended in opposite directions outboard of opposite sides of the chassis wherein the second support member includes a resilient member operable for receiving the second end of the stand.

6. The IHS of claim 5 wherein the first end of the stand includes a key.

7. The IHS of claim 6 wherein the first support member includes a key rejecting member.

8. The IHS of claim 5 wherein the second support member includes guide members operable for guiding the second end of the stand into the resilient member.

9. The IHS of claim 5 wherein the second support member includes a key rejecting member.

10. A method of stabilizing a floor standing electronics chassis comprising:
    providing a chassis having a support surface and a pair of spaced apart support members mounted on the support surface;

providing a first one of the support members with a slotted keyed first receiver for a support stand formed by a continuous member and providing a second one of the support members with a snap-in releasable retainer including a second receiver for the support stand;

providing the support stand including a pair of feet extended in opposite directions outboard of opposite sides of the electronics chassis;

inserting a first keyed end of the support stand into engagement with the keyed receiver; and engaging a second end of the support stand with the second receiver of the releasable retainer wherein the second support member includes a resilient member operable for receiving the second end of the stand.

11. The method of claim 10 wherein the first end of the support stand includes a protruding key.

12. The method of claim 10 wherein the first one of the support members includes a key rejecting member.

* * * * *